United States Patent [19]

Martens

[11] Patent Number: 5,209,830
[45] Date of Patent: May 11, 1993

[54] ARRANGEMENT FOR MEASURING THE LIGHT RADIATION OF A PLASMA

[75] Inventor: Thomas Martens, Krombach, Fed. Rep. of Germany

[73] Assignee: Leybold Aktiengesellschaft, Hanau, Fed. Rep. of Germany

[21] Appl. No.: 756,340

[22] Filed: Sep. 6, 1991

[30] Foreign Application Priority Data

Jul. 17, 1991 [DE] Fed. Rep. of Germany ....... 4123589

[51] Int. Cl.[5] ............................................ C23C 14/34
[52] U.S. Cl. ............................ 204/298.03; 204/192.13
[58] Field of Search ...................... 204/192.13, 298.03, 204/192.33, 298.32

[56] References Cited

U.S. PATENT DOCUMENTS 4,166,784  9/1979  Chapin et al. ................. 204/192 R
4,983,269  1/1991  Wegmann ...................... 204/192.13

FOREIGN PATENT DOCUMENTS 3803840   8/1989  Fed. Rep. of Germany .
1319674  12/1989  Japan .............................. 204/298.03

OTHER PUBLICATIONS

Gale et al., "A simple ... optics", J. Vac. Sci. Technol., 20(1), Jan. 1982, pp. 16–20.
Severin: Sputtern, Physik in unserer Zeit, 1986, p. 73, Illustration upper right.

*Primary Examiner*—Nam X. Nguyen
*Attorney, Agent, or Firm*—Felfe & Lynch

[57] ABSTRACT

The invention relates to an arrangement for measuring the light radiation of a plasma with sputter cathodes. Herein a light-sensitive sensor (15) is acted upon by the light from an optical fiber or from a bundle of optical fibers (14) which is (are) guided through an opening (13) of the sputter cathode (8). In this way the light intensity of the sputter plasma in the region of the sputtering crater of a target (9) can be measured. Moreover, it is possible to measure in simple manner the light intensities of several regions of the plasma.

13 Claims, 1 Drawing Sheet

ARRANGEMENT FOR MEASURING THE LIGHT RADIATION OF A PLASMA

The invention relates to an arrangement for measuring light radiation according to the preamble of Patent Claim 1.

In plasma technology it is often necessary to determine the physical state of the plasma expressed inter alia in its brightness. For this purpose light measurements must be carried out which in most cases are fraught with problems because the plasma coats the light sensors or it is disposed in a housing impermeable to light.

In order to measure plasma light radiation it is already known to provide quartz windows in light-impermeable plasma vessels through which light falls onto a photocell (U.S. Pat. No. 4,166,784). Herewith it is however not possible to carry out local intensity measurements of adjacent plasmas.

It is also known to determine plasma light radiation via a fiber optics cable (DE-A-3 803 840). Herein, however, the fiber optics cables can readily be coated by the plasma.

The invention is based on the task of creating an arrangement for measuring the light radiation of a plasma in which the light sensor which measures the luminance is disposed at a safe distance from the plasma source.

This task is solved according to the features of Patent Claim 1.

The advantage achieved with the invention resides in particular therein that a local intensity measurement of adjacent plasmas is possible. Moreover, with round cathode multi-ring systems a separation of the inner and outer intensity can take place. Hereby different sputtering rates can be set or regulated. Through the small aperture of the optical fiber the regulation of individual plasma rings is possible. Added to this is the fact that the fiber optical waveguides which receives the plasma light forms a structural unit with the cathode which can be fixedly adjusted.

An embodiment example of the invention is depicted in the drawing and described in further detail in the following. Therein show:

DETAILED DESCRIPTION OF THE DRAWINGS

Figure 1:
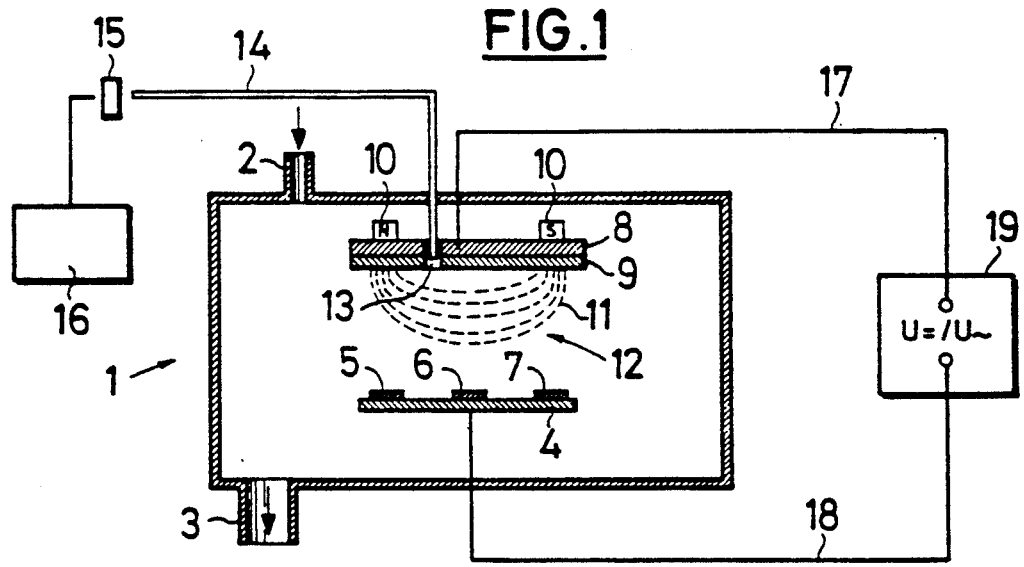
FIG. 1 a basic schematic representation of a sputtering chamber with an arrangement for detecting plasma light.

In FIG. 1 is depicted the principle of a sputtering chamber 1 which is provided with a gas inlet 2 and a pump port 3 for evacuating the sputtering chamber 1. On a plate 4, disposed in the vacuum chamber 1 and serving as anode, several substrates 5, 6, 7 are disposed which are to be etched or provided with a sputtered layer. Opposite to and at a distance from this plate 4 is disposed a cathode 8 which has a target 9 on its side facing the plate 4. On the other side of the cathode 8 is disposed a permanent magnet 10 whose magnetic field 11 penetrates the cathode 8 and the target 9 and forms an arching form in the plasma region 12 proper. The permanent magnet is indicated only symbolically. The depicted north or south poles can be for example the ends of a horseshoe magnet which is not shown in detail. The cathode 8 and the target 9 are in each instance provided with a bore and specifically at opposing sites so that a continuous bore 13 results into which projects the end of an optical fiber 14. The other end of the optical fiber 14 is opposed by a light-sensitive sensor 15 which converts the light impinging on it from the optical fiber 14 into an electrical signal and guides it to an evalution device 16.

For the sake of clarity only one optical fiber 14 is depicted in FIG. 1. It is understood that in practice at several sites of the cathode 8 or the target 9 bores can be provided into which project in each instance separate optical fibers.

The cathode 8 and the anode 4 are connected via lines 17, 18 to a voltage source 19 which is a dc or ac voltage source. A dc current source is suitable as a rule only for target materials which are electrical conductors such as for example metals and most semiconductors while an ac current source of for example 13.56 MHz can also be used for target materials that are nonconductors.

Through the gas inlet 2 an inert gas such as for example argon is introduced into a sputtering chamber 1 evacuated to a pressure of 0.1 to 0.01 mbars, which is ionized at an applied voltage of for example a dc voltage of 1 to 3 kV. The positive ions of this inert gas are accelerated through the electric field of the applied dc voltage and impinge with great velocity onto the target 9 where they knock particles out of it which are deposited on the substrates 5 to 7. Through the magnetic field 11 the electrons of the plasma are brought onto a helical path whereby the probability of a collision with a neutral inert gas molecule is increased. The inert gas molecule is ionized through this collision.

Figure 2:
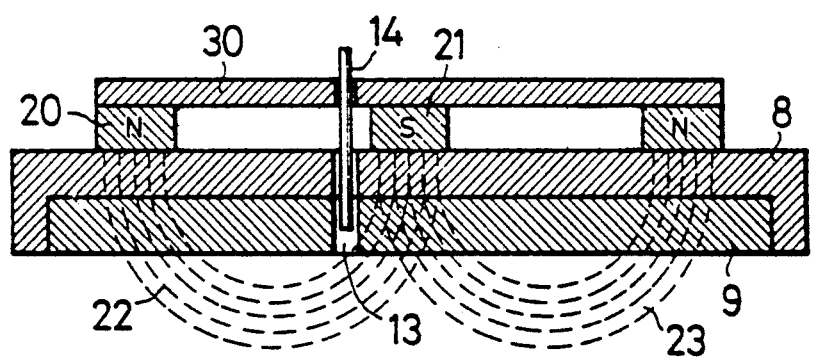
FIG. 2 an enlarged representation of a cathode with a target and a fiber optical waveguide.

In FIG. 2 is depicted the region around the bore 13 in an enlarged scale. The permanent magnet herein has a north pole 20 in the shape of a rectangular frame while the south pole 21 is disposed as rectangular strip within the north pole 20. Due to this configuration an encompassing magnetic field is formed (cf. Severin: Sputtern, Physik in unserer Zeit, 1986, page 73, Illustration upper right). The electrode 8 is implemented as a pan open in the downward direction which encompasses the target. Onto the permanent magnet 20, 21 is placed a yoke plate 30 for field closure.

After operation over a relatively long period of time on the underside of target 9 and between the north and south poles of the permanent magnet 20, 21 craters are formed which can be traced back to the increased bombardment through ions.

Round cathodes, delta cathodes, and elliptical cathodes are also conceivable instead of the depicted rectangular cathode (Severin, op.cit., page 75, Illustration 8).

Figure 3:
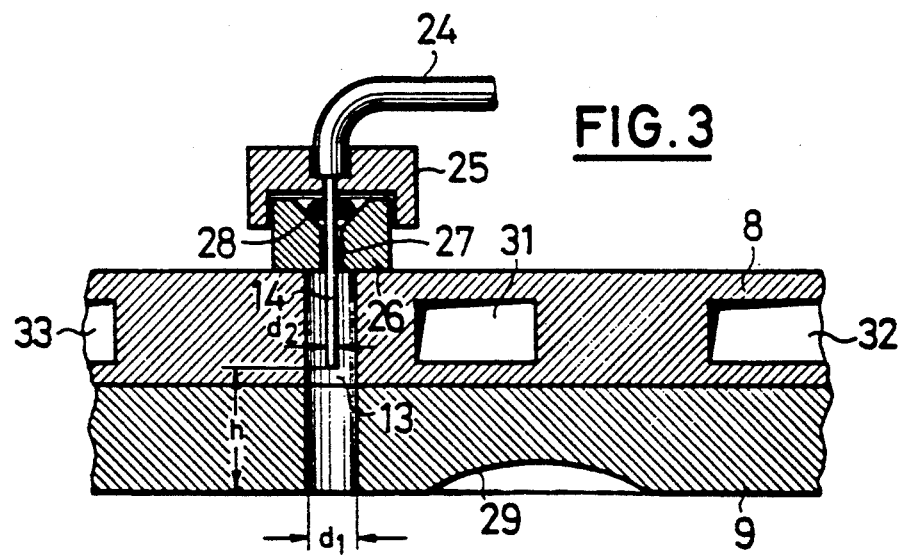
FIG. 3 an arrangement for fastening a fiber optical waveguide on a target carrier pan.

FIG. 3 shows a detail from FIG. 2 wherein the mounting of the optical fiber 14 is shown in greater detail. Instead of an optical fiber an optical fiber bundle can also be used. The optical fiber 14 is provided with a shielding 24 fitted into a screw cap 25 which, in turn, is screwed onto a carrier 26 welded together with the cathode 8. The carrier 26 has a bore 27 which expands conically in its upper region and there carries a sealing ring 28 which encompasses the optical fiber 14. The diameter $d_1$ of bore 13 is approximately 2 to 3 mm while the diameter $d_2$ of the optical fiber is approximately 1.2 to 1.5 mm. The distance h of the lower edge of the optical fiber 14 from the underside of the target is selected to be $h > 10$ mm while $d_1 < 3$ mm in order to prevent parasitic plasmas in the pressure range $10^{-3}$ mbars which could bring about a contamination or sputtering of the optical fiber waveguide 14. By 29 is denoted a crater which is generated at the site where the magnetic field 22, 23 extends parallel to the target.

In the cathode 8 are provided cooling water channels 31, 32, 33 between which is disposed the optical fiber 14.

Below the cooling water channel 33 is also formed a crater which, however, is not shown.

I claim:

1. Arrangement for measuring the light radiation of a plasma which is generated with the aid of at least one electrode comprising: a light-sensitive sensor which is acted upon by a luminance proportional to luminance of the plasma, an electrode (8) provided with a bore (13), an end of an optical fiber (14) being disposed in the bore 13, another end of the optical fiber being guided to the light-sensitive sensor (15), a target (9) with a sputtering crater (29) and being disposed on the electrode (8) and having a bore aligned with the bore 13 of the electrode (8), the bore of the target being disposed between the sputtering crater (29) and a site of the target (9) into which a magnetic field enters or from which it exits and the bore of the target being no larger than a dark zone.

2. Arrangement as stated in claim 1, in which the electrode (8) is a cathode and wherein the bore of the target (9) receives an end of the optical fiber (14).

3. Arrangement as stated in claim 2, which includes a magnetron cathode (8, 10) comprising the electrode (8) and at least one magnet (10) forming a magnetic field which exits from the target (9) and leads back to the target (9).

4. Arrangement as stated in claim 2, in which a distance (h) of a lower edge of the optical fiber to a lower edge of the target is selected so that a diaphragm effect occurs which prevents that particles impinging obliquely completely sputter the optical fiber.

5. Arrangement as stated in claim 1, in which instead of a single optical fiber a bundle of optical fibers is used.

6. Arrangement as stated in claim 1, in which the electrode (8) is connected to a negative dc voltage potential.

7. Arrangement as stated in claim 1, in which the electrode (8) is connected to an ac voltage potential.

8. Arrangement as stated in claim 1, in which the electrode (8) is target holder and which includes for each target (9) at least one optical fiber.

9. Arrangement as stated in claim 8, in which the target holder and the target (9) have bores directed along a common axis.

10. Arrangement as stated in claim 9, in which the bores have a diameter of 2 to 3 mm which at a pressure of $10^{-3}$ mbars corresponds to the dark zone of a glow discharge.

11. Arrangement as stated in claim 1, in which the optical fiber has a diameter of 1.2 to 1.5 mm.

12. Arrangement as stated in claim 1, in which the electrode (8) has several bores wherein in each bore is disposed an end of an individual optical fiber or an optical fiber bundle and wherein in each instance another end of an optical fiber is guided to a light-sensitive sensor.

13. Arrangement as stated in claim 12, in which for several optical fibers only one light-sensitive sensor is provided and ends of the optical fibers are brought sequentially in time into a position which opposes the sensor.

* * * * *